United States Patent
Jin et al.

(10) Patent No.: US 12,380,301 B2
(45) Date of Patent: Aug. 5, 2025

(54) METHOD AND APPARATUS FOR RECOGNIZING AVPS MARKER FOR LOCALIZATION BASED ON AVPS MARKER

(71) Applicant: HYUNDAI MOBIS CO., LTD., Seoul (KR)

(72) Inventors: Moon Yong Jin, Yongin-si (KR); Jun Ho Choi, Uiwang-si (KR); Ki Chan Kim, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/817,590

(22) Filed: Aug. 28, 2024

(65) Prior Publication Data

US 2025/0131220 A1 Apr. 24, 2025

(30) Foreign Application Priority Data

Oct. 23, 2023 (KR) .................. 10-2023-0142111

(51) Int. Cl.
*G06K 7/14* (2006.01)
*G06T 7/11* (2017.01)
(Continued)

(52) U.S. Cl.
CPC .............. *G06K 7/1443* (2013.01); *G06T 7/11* (2017.01); *G06V 10/25* (2022.01); *G06V 10/751* (2022.01); *G06V 10/764* (2022.01)

(58) Field of Classification Search
CPC ........ G06K 7/1443; G06T 7/11; G06V 10/25; G06V 10/751; G06V 10/764
See application file for complete search history.

(56) References Cited

U.S. PATENT DOCUMENTS

| 2009/0208125 A1* | 8/2009 | Kajiwara | ................. H04N 1/41 382/243 |
| 2014/0321748 A1* | 10/2014 | Ruan | ...................... G06T 7/194 382/180 |

(Continued)

FOREIGN PATENT DOCUMENTS

EP 3098757 A1 * 11/2016 ......... G06K 7/10732

OTHER PUBLICATIONS

Kalaitzakis et al., Overview, Applications and Experimental Comparison of the ARTag, AprilTag, ArUco and STag Markers, Fiducial for Pose Estimation, Received: Oct. 7, 2020 / Accepted: Dec. 30, 2020 / Published online: Mar. 2, 2602, X037435473.

(Continued)

*Primary Examiner* — Tuyen K Vo
(74) *Attorney, Agent, or Firm* — Morgan, Lewis & Bockius LLP

(57) ABSTRACT

The present disclosure provides a method for recognizing a coded marker including: obtaining a marker image including a coded marker from an input image and normalizing the marker image to obtain a normalized image detecting a region of interest in the normalized image; generating a first binarized image by performing binarization to classify each pixel of the normalized image into one of a foreground and a background; generating a second binarized image by dividing the normalized image into a plurality of partitions, performing binarization for pixel values for each partition to generate a binarized image for the each partition, and combining the binarized images for the each partition; generating an integrated binarized image according to a result of comparing pixel values at the same location in the first binarized image and the second binarized image; and obtaining identification data of the coded marker from the integrated binarized image.

20 Claims, 14 Drawing Sheets

(51) Int. Cl.
G06V 10/25 (2022.01)
G06V 10/75 (2022.01)
G06V 10/764 (2022.01)

(56) References Cited

U.S. PATENT DOCUMENTS

| | | | | |
|---|---|---|---|---|
| 2016/0034783 | A1* | 2/2016 | Cheng | G06T 7/33 |
| | | | | 382/195 |
| 2016/0300358 | A1* | 10/2016 | Minato | G06T 7/136 |
| 2019/0164313 | A1* | 5/2019 | Ma | G06N 7/00 |
| 2019/0325611 | A1* | 10/2019 | Takeda | G06T 7/90 |
| 2023/0004747 | A1* | 1/2023 | Zhu | G06N 3/0464 |
| 2023/0177699 | A1* | 6/2023 | Ray | G06T 7/194 |
| | | | | 382/173 |

OTHER PUBLICATIONS

Wang et al., An Image Binarization Segmentation Method Combining Global and Local Threshold for Uneven Illumination Image, The 723th Research Institute of China Shipbuilding Industy Corporation, Yangzhou 225001, China, ICIC 2022, LNCS 13393, pp. 379-390, 2022, https://doi.org/10.1007/978-3-031-13870-6_31, XP047630832.

Romero-Ramirez, et al., Speeded up detection of squared fiducial markers, Image and Vision Computing, Image and Vision Computing 76 (2018) 38-47, Received Nov. 27, 2017 Received in revised form Mar. 22, 2018 Accepted May 26, 2018 Available online Jun. 15, 2018, XP085435041

Extended European Search Report issued on Mar. 25, 2025 in European Patent Application No. 24204586.2.

* cited by examiner

```
For(tInt d=7; d>=0; d--){
    if(m_bitCode.m_bBits[d] == 1)
    {
        m_candidate.ID += (1<<d); // 2^d
    }
}
```

METHOD AND APPARATUS FOR RECOGNIZING AVPS MARKER FOR LOCALIZATION BASED ON AVPS MARKER

CROSS-REFERENCE TO RELATED APPLICATIONS

This application claims the benefit of Korean Patent Application Number 10-2023-0142111, filed on Oct. 23, 2023, the entire contents of which are incorporated herein by reference.

TECHNICAL FIELD

The present disclosure relates to a method and apparatus for recognizing an AVPS marker for localization based on the AVPS marker.

BACKGROUND

The description in this section merely provides background information related to the present disclosure and does not necessarily constitute the related art.

An automated valet parking system (AVPS) is being developed for parking convenience. The AVPS automatically operates a vehicle so that the vehicle moves to an empty parking space and parks when a driver gets off at a drop-off area in a parking facility. Further, the AVPS automatically moves a parked vehicle to a pick-up area upon the driver's request, allowing the driver to board the vehicle.

For safe and reliable AVPS, level 4 or higher autonomous driving is required. The AVPS must not only recognize other objects to prevent collisions, but also determine an empty parking space and a traveling route and automatically move, park, and exit vehicles. To this end, a localization technology for estimating a current position of a subject vehicle is important.

The AVPS adopts vision-based localization using a high definition map and cameras as a localization technology. The AVPS uses a coded marker specified in ISO 23374 for localization. The coded marker is a type of fiducial marker, and may be installed in a parking facility and recognized by a vehicle. The fiducial marker is an artificial marker, an object placed in the field of view of an imaging system that appears in the image produced, for use as a point of reference or a measure. The high definition map may include information on ID, position, orientation, and the like of coded markers installed in a parking facility. The accuracy of coded marker recognition affects vehicle localization performance in the AVPS.

Conventional technologies for detecting fiducial markers include a detection method using ArUco markers, which are often used in augmented reality (AR), camera pose estimation, camera calibration, etc.

Detection using the ArUco markers may be accomplished by a method using general image processing techniques or a method of detection using deep learning.

In the case of general image processing techniques, when used in the AR, a method is used to detect and recognize candidate markers using a general image processing method, then estimate the camera pose and the pose of the marker, and display a virtual object on the marker.

However, general image processing methods are suitable for simple environments, but are not suitable for vehicles operating in parking lots. There are various environments in parking lots, such as low light, reflections due to natural light (for example, sunlight) or artificial light (for example, headlamps, parking lot lights, etc.), and shadows. Accordingly, in general image processing methods, the acquired image is binarized to a constant value using a simple otsu threshold, so the binarization performance of the acquired image deteriorates in an environment with uneven lighting.

In addition, an ArUco marker detection method using deep learning generates and learns occluded markers, allowing the marker to be recognized well even when the marker is obscured by an object. However, in the case of a method using deep learning, the marker is detected in the form of a box, so it is difficult to recognize the marker even if the marker is detected in a highly distorted image.

SUMMARY

An aspect of the present disclosure is directed to providing a method and apparatus for recognizing an AVPS marker for positioning based on the AVPS marker.

The aspects of the present disclosure are not limited to those mentioned above, and other aspects not mentioned herein will be clearly understood by those skilled in the art from the following description.

According to at least one embodiment, the present disclosure provides an apparatus comprising at least one processor and a memory operably connected to the at least one processor, wherein the memory stores instructions for causing the at least one processor to perform operations in response to execution of instructions by the at least one processor, the operations comprising: obtaining a marker image including a coded marker from an input image and normalizing the marker image to obtain a normalized image; detecting a region of interest in the normalized image; generating a first binarized image by performing binarization to classify each pixel of the normalized image into one of a foreground and a background; generating a second binarized image by dividing the normalized image into a plurality of partitions, performing binarization for pixel values for each partition to generate a binarized image for the each partition, and combining the binarized images for the each partition; generating an integrated binarized image according to a result of comparing pixel values at the same location in the first binarized image and the second binarized image; and obtaining identification data of the coded marker from the integrated binarized image.

According to another embodiment, the present disclosure provides a method for recognizing a coded marker including: obtaining a marker image including a coded marker from an input image and normalizing the marker image to obtain a normalized image detecting a region of interest in the normalized image; generating a first binarized image by performing binarization to classify each pixel of the normalized image into one of a foreground and a background; generating a second binarized image by dividing the normalized image into a plurality of partitions, performing binarization for pixel values for each partition to generate a binarized image for the each partition, and combining the binarized images for the each partition; generating an integrated binarized image according to a result of comparing pixel values at the same location in the first binarized image and the second binarized image; and obtaining identification data of the coded marker from the integrated binarized image.

According to an embodiment of the present disclosure, an ID of the coded marker can be recognized more accurately.

Based on the accurately recognized coded marker ID, accurate vehicle location can be estimated, improving the accuracy and stability of vehicle location recognition.

The benefits of the present disclosure are not limited to those mentioned above, and other benefits not mentioned herein will be clearly understood by those skilled in the art from the following description.

DETAILED DESCRIPTION

Figure 1:
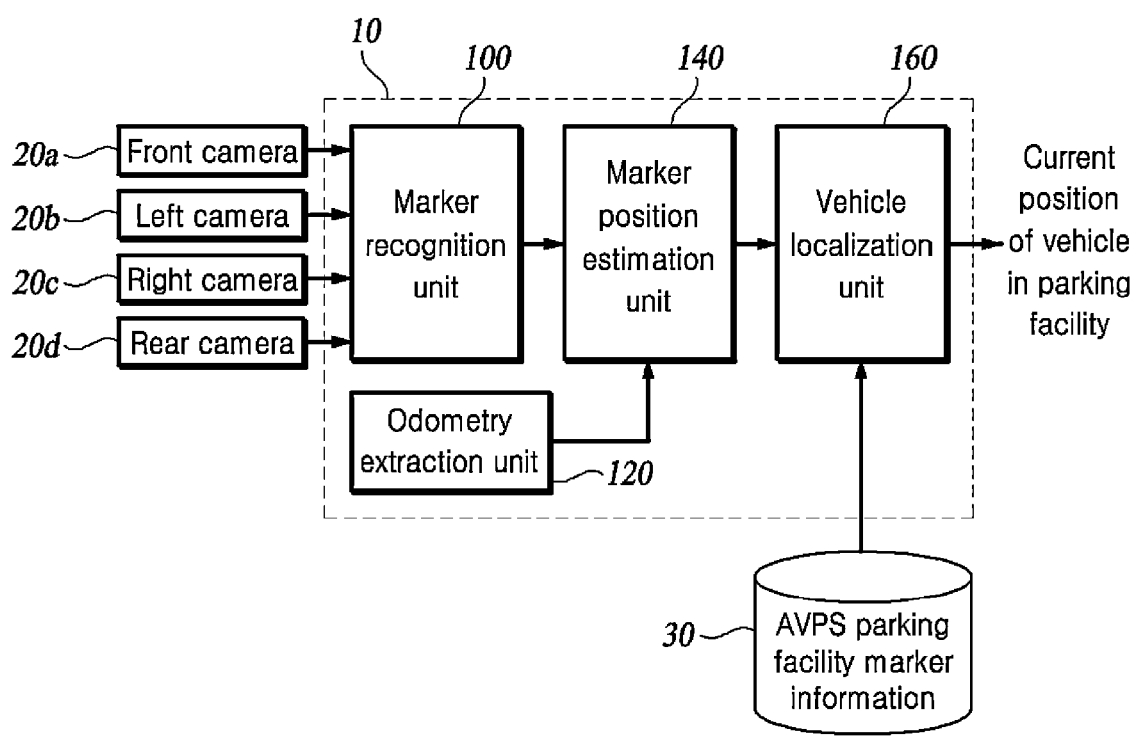
FIG. 1 is a block diagram illustrating the configuration of a vehicle positioning system 10 according to an embodiment of the present disclosure.

Hereinafter, some embodiments of the present disclosure will be described in detail with reference to the accompanying illustrative drawings. In the following description, like reference numerals preferably designate like elements, although the elements are shown in different drawings. Further, in the following description of some embodiments, a detailed description of related known components and functions when considered to obscure the subject matter of embodiments of the present disclosure will be omitted for the purpose of clarity and for brevity.

Various ordinal numbers or alpha codes such as first, second, i), ii), a), b), etc. are prefixed solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

The description of embodiments of the present disclosure to be presented below in conjunction with the accompanying drawings is intended to describe exemplary embodiments of the present disclosure and is not intended to represent the only embodiments in which the technical idea of the present disclosure may be practiced.

Figure 2:
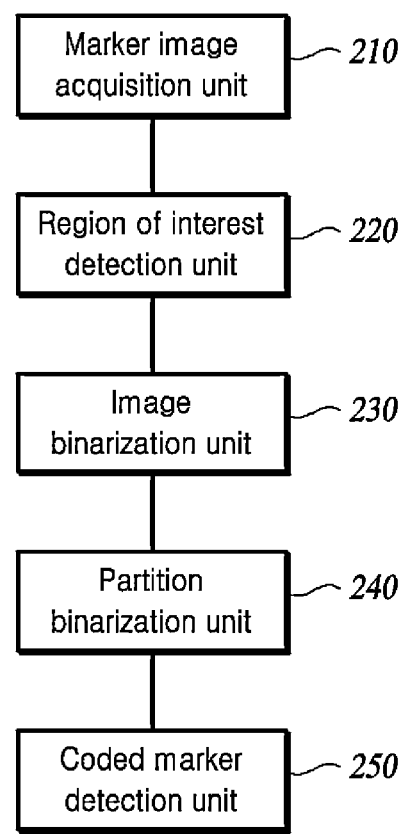
FIG. 2 is a block diagram illustrating the configuration of a coded marker recognition apparatus 100 that implements a marker recognition unit 100 of FIG. 1.

FIG. 1 is a block diagram illustrating the configuration of a vehicle positioning system 10 according to an embodiment of the present disclosure. FIG. 2 is a block diagram illustrating the configuration of a coded marker recognition apparatus 100 that implements a marker recognition unit 100 of FIG. 1.

Hereinafter, the operation of the vehicle positioning system 10 and the coded marker recognition apparatus 100 will be described with reference to FIGS. 1 and 2.

Referring to FIG. 1, the vehicle positioning system 10 according to an embodiment of the present disclosure obtains the current location of a vehicle. The vehicle positioning system 10 may recognize a coded marker in an image, estimate the location of the coded marker using a coded marker recognition result and the odometry information of the vehicle, and then calculate the current location of the vehicle by performing map matching based on the estimated coded marker location and AVPS parking facility marker information 30. To this end, the vehicle positioning system 10 includes all or part of a marker recognition unit 100, an odometry extraction unit 120, a marker location estimation unit 140, and a vehicle positioning unit 160.

The marker recognition unit 100 recognizes the coded marker within a parking facility using images taken of the front, left, right, and rear of a vehicle, respectively, acquired from a plurality of cameras 20a, 20b, 20c, and 20d. The marker recognition unit 100 outputs a coded marker recognition result including the ID, bounding box, and corner points of an AVPS coded marker in the image.

To this end, the marker recognition unit 100 may perform marker detection, marker classification, and marker tracking.

Marker detection is a process of simultaneously detecting the bounding boxes and corner points of objects belonging to the class corresponding to the coded marker within each input image frame, using a deep learning network trained through multi-task learning, without being limited thereto.

Marker classification is a process of extracting the region of interest (ROI) corresponding to the coded marker in each image frame using a detection result and identifying a coded marker ID by performing decoding on the ROI.

Marker tracking is a process of tracking changes in the location of a coded marker within a series of image frames. Coded marker tracking may be performed by additionally utilizing the identified coded marker ID information.

The odometry extraction unit 120 periodically calculates the longitudinal and lateral movement distances of a vehicle over time through wheel odometry and stores the same in a buffer. The wheel odometry refers to estimating changes in the location of the vehicle over time using vehicle specification information and vehicle sensor information. The vehicle specification information may include the wheel base, the number of wheel teeth, and the wheel size. The vehicle sensor information may include a wheel speed signal, a wheel pulse signal, and a steering angle signal received through a chassis controller area network (CAN).

The marker location estimation unit 140 estimates the location of a vehicle reference coded marker, including the distance and direction to the coded marker based on the center of a vehicle. Herein, the term "vehicle reference" refers to the relative location and direction of the coded marker with the center of the vehicle as an origin.

Using the recognition result of the coded marker, the actual size of the coded marker, and internal/external parameters of the camera, the distance and direction from a camera reference coded marker may be obtained. Herein, the term "camera reference" refers to the relative distance and direction of the coded marker with the camera as an origin. Thereafter, a vehicle reference coded marker location may be estimated by moving a reference point of the coded marker distance and direction to the center of the vehicle using the vehicle specifications and the camera installation location.

A delay time occurs from a time t1 when the marker recognition unit 100 receives an image to a time t2 when the coded marker recognition result in the image is output. The longer the delay time, the lower the accuracy of vehicle reference coded marker location estimation based on the coded marker recognition result due to the movement of a vehicle. Accordingly, the marker location estimation unit 140 may use the buffer data stored in the odometry extraction unit 120 to obtain the longitudinal and lateral movement distance of the vehicle between the time t1 and the time t2, and use the obtained movement distance to correct the estimation result of the vehicle reference coded marker location.

The vehicle positioning unit 160 obtains the current location of a vehicle within a parking facility based on coded marker recognition information (in other words, information on an ID of the coded marker and the vehicle reference coded marker location) and the AVPS parking facility marker information 30. The vehicle positioning unit 160 may match the ID of the recognized coded marker with the marker ID in the AVPS parking facility marker information 30 and may obtain the current location of the vehicle within the parking facility using the vehicle reference coded marker location.

The coded marker recognition apparatus 100 according to an embodiment of the present disclosure includes all or part of a marker image acquisition unit 210, an ROI detection unit 220, and an image binarization unit 230, a partition binarization unit 240, and a coded marker detection unit 250. Herein, the coded marker recognition apparatus 100 may be implemented by excluding some of the components of FIG. 2 or may be implemented by further including other components.

The marker image acquisition unit 210 acquires an image including a coded marker, that is, a coded marker image, from an input image, and normalizes the coded marker image to acquire a normalized image.

Herein, the original coded marker image may be an image including a coded marker with some degree of distortion. When an image including a coded marker with distortion is normalized, the distortion may be removed.

Figure 3:
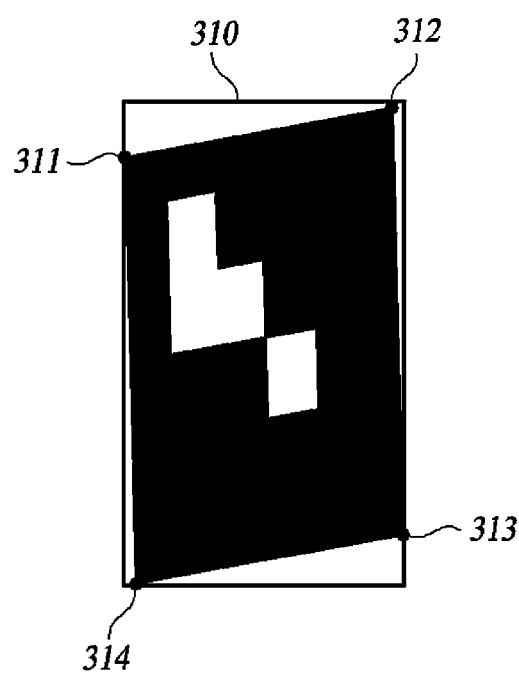
FIG. 3 is a diagram illustrating an image 310 including a coded marker.
Figure 4:
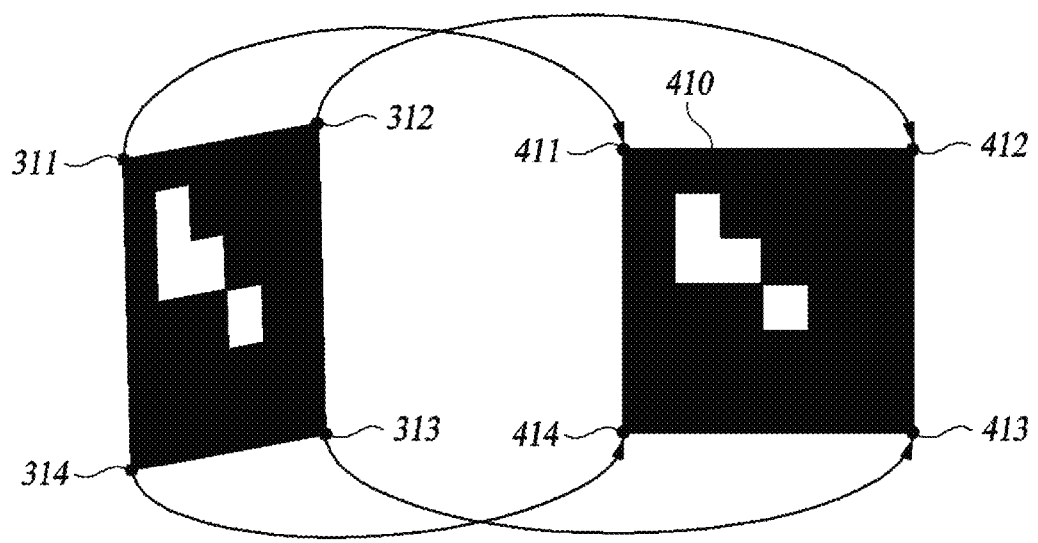
FIG. 4 is a diagram illustrating a case where a normalized image 410 is generated from the image 310 including the coded marker.

FIG. 3 is a diagram illustrating an image 310 including a coded marker. FIG. 4 is a diagram illustrating a case where a normalized image 410 is generated from the image 310 including the coded marker.

The marker image acquisition unit 210 receives images obtained from each of the cameras 20a, 20b, 20c, and 20d, and detects four corner points 311, 312, 313, and 314 related to the AVPS coded marker from the input image, generates a boundary box from the four corner points 311, 312, 313, and 314, and acquires the region within the boundary box as the original coded marker image.

The marker image acquisition unit 210 may obtain the square-shaped normalized image 410 by performing warping on the image 310 including the original coded marker. The marker image acquisition unit 210 obtains a homography matrix representing the relationship between the four corner points 311, 312, 313, and 314 and corner point coordinates 411, 412, 413, and 414 of the normalized image 410. Thereafter, by performing bilinear interpolation on the image 310 containing the original coded marker, the normalized image 410 may be generated to generate an image including the coded marker without distortion. Herein, when the normalization process is not performed, the image 310 including the coded marker may be considered the normalized image 410.

In this embodiment, technical details regarding a method of acquiring the normalized image 410 from the image 310 including the coded marker are beyond the gist of the present disclosure, so further detailed description thereof will be omitted.

The ROI detection unit 220 detects the ROI for the normalized image 410. The ROI detection unit 220 detects a region in the normalized image 410 where the AVPS coded marker is determined to be located as the ROI.

Herein, the ROI detection unit 220 may generate an integral image for the normalized image 410 and detect the ROI using the integral image. In the following description, the normalized image 410 may be the original normalized image 410 before generation of the integral image, or may be the integral image of the normalized image 410.

FIGS. 5A-5D are diagrams illustrating search regions for each location in the normalized image 410. FIG. 6 is a diagram illustrating 2-rectangle type harr-like features for the search regions for each location.

Figure 5A:
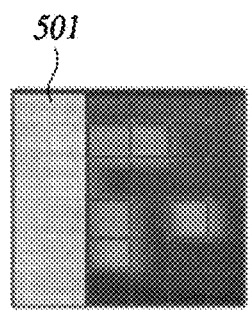
FIGS. 5A-5D are diagrams illustrating search regions for each location in the normalized image 410.
Figure 5B:
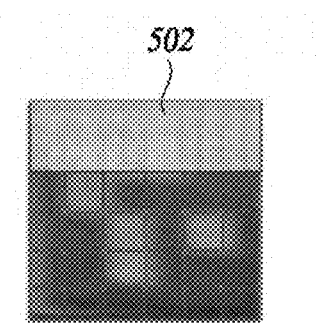
Figure 5C:
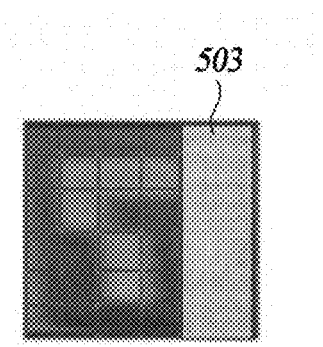
Figure 5D:
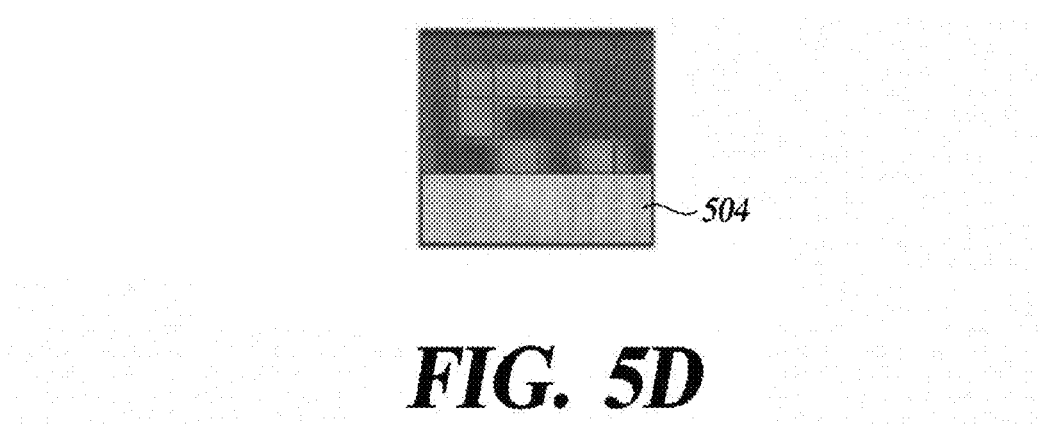
Figure 6:
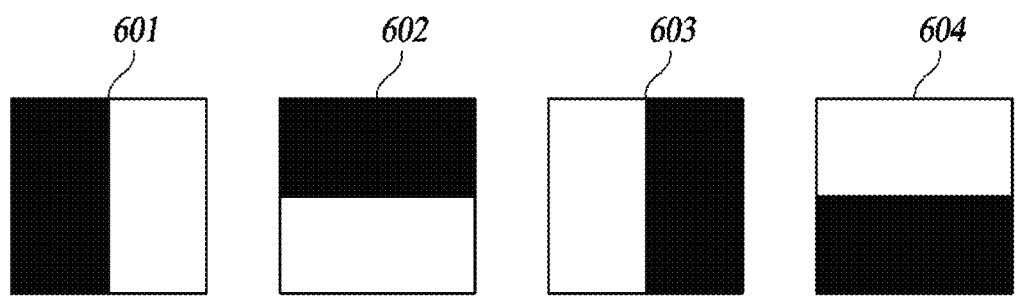
FIG. 6 is a diagram illustrating 2-rectangle type harr-like features for the search regions for each location.

The ROI detection unit 220 sets a left ⅓ region of the normalized image 410 as a left search region 501 as shown in FIG. 5A, sets a top ⅓ region of the normalized image 410 as a top search region 502 as shown in FIG. 5B, sets a right ⅓ region of the normalized image 410 as a right search region 503 as shown in FIG. 5C, and sets a bottom ⅓ region of the normalized image 510 as a bottom search region 504 as shown in FIG. 5D.

The ROI detection unit 220 performs each harr-like feature search using a first harr-like feature 601 for the left search region 501, a second harr-like feature 602 for the top search region 502, a third harr-like feature 603 for the right search region 503, and a fourth harr-like feature 604 for the bottom search region 504.

The ROI detection unit 220 searches the left search region 501 using the first harr-like feature 601 to acquire a left coordinate (left) of a white region within the left search region 501, searches the top search region 502 using the second harr-like feature 602 to acquire a top coordinate (top) of the white region within the top search region 502, searches the right search region 503 using the third harr-like feature 603 to acquire a right coordinate (right) of the white region within the right search region 503, and searches the bottom search region 504 using the fourth harr-like feature 604 to acquire a bottom coordinate (bottom) of the white region within the bottom search region 504.

Figure 7:
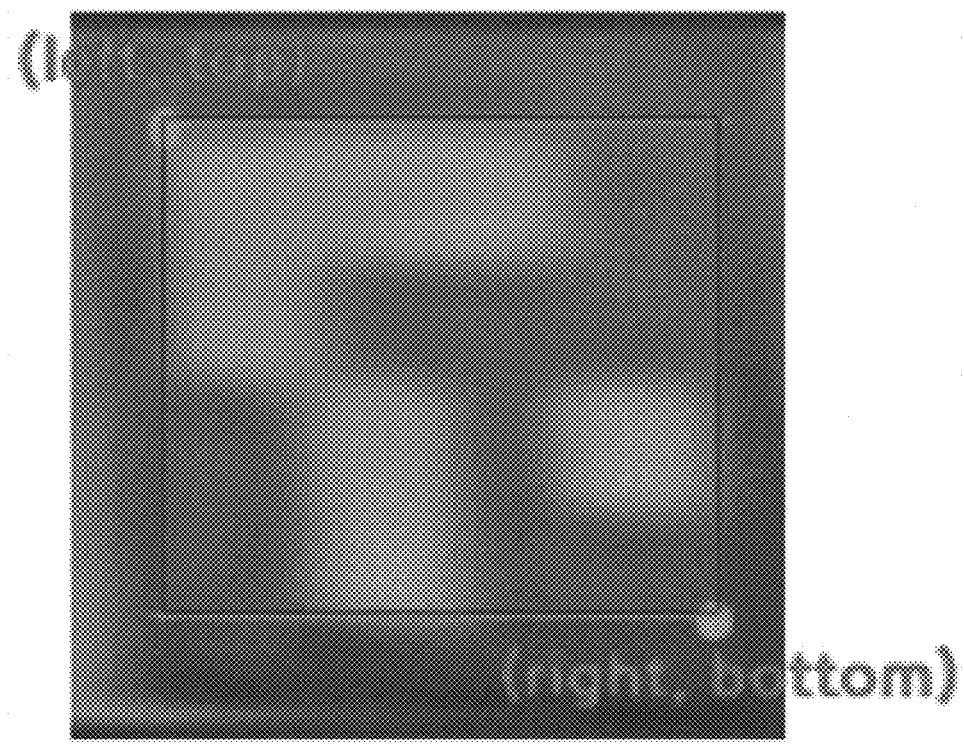
FIG. 7 is a diagram illustrating the form of the detected region of interest.

FIG. 7 is a diagram illustrating the form of the detected region of interest.

It is assumed that the horizontal axis of the normalized image 410 is an x-axis and the vertical axis is an y-axis. As illustrated in FIG. 7, the ROI detection unit 220 detects the ROI characterized by a left and top coordinate (left, top) and a right and bottom coordinate (right, bottom), in other words, the region where the AVPS coded marker is estimated to exist. Herein, the ROI is described as characterized by the left and top coordinate (left, top) and the right and bottom coordinate (right, bottom), but is not limited thereto. Depending on the embodiment, the ROI may be characterized by a left and bottom coordinate (left, bottom) and a right and top coordinate (right, top). As such, the ROI may be characterized by edges facing each other.

The image binarization unit 230 generates a first binarized image by performing binarization to classify each pixel of the normalized image into one of a foreground and a background. In this embodiment, the term "binarization" refers to the operation of classifying each pixel of a target image into one of the foreground and the background based on a reference value.

The image binarization unit 230 acquires a first median value, which is an median value of pixels of the ROI in the normalized image, as a reference value, and performs the binarization on each pixel value of the normalized image depending on whether the each pixel value thereof is greater than or equal to the first median value.

In other words, the image binarization unit 230 generates the first binarized image by performing binarization to classify pixel values of the normalized image that are greater than or equal to the first median value as the foreground and classify those that are not greater than or equal to the first median value as the background.

In this embodiment, when binarization is performed, the pixel corresponding to the foreground may have its value set to 255, and the pixel corresponding to the background may have its value set to 0, but an embodiment of the present disclosure is not limited thereto.

The partition binarization unit 240 divides the normalized image into a plurality of partitions, performs the binarization on the pixel values for each partition, generates a binarized image for the each partition, and combines the binarized images for the each partition to generate a second binarized image.

Figure 8:
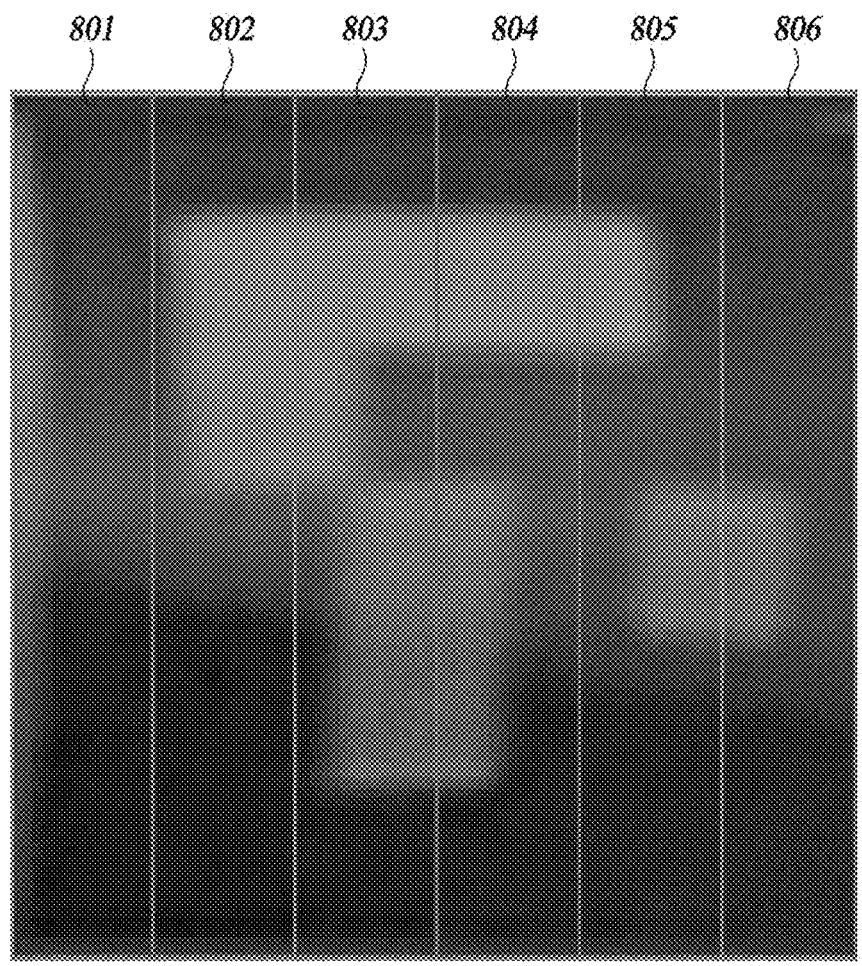
FIG. 8 is a diagram illustrating an example in which a normalized image is divided into a plurality of partitions.

FIG. 8 is a diagram illustrating an example in which a normalized image is divided into a plurality of partitions.

As illustrated in FIG. 8, the normalized image may be divided into six partitions 801, 802, 803, 804, 805, and 806.

In FIG. 8, the normalized image is divided into a plurality of partitions on the left and right, but the division may have various forms, such as grid-type division.

The partition binarization unit 240 performs binarization for each partition 801, 802, 803, 804, 805, or 806.

The partition binarization unit 240 acquires, for each partition 801, 802, 803, 804, 805, or 806, each second median value, which is the median value of an border pixel value of the corresponding partitions 801, 802, 803, 804, 805, and 806, as each reference value.

The partition binarization unit 240 binarizes the pixel value of each partition depending on whether the pixel value of each partition 801, 802, 803, 804, 805, or 806 is greater than or equal to the second median value, and acquires a binarized image for each partition. In other words, the partition division binarization unit 240 performs binarization by classifying pixels that are greater than or equal to each second median value as the foreground among the pixel values of each partition 801, 802, 803, 804, 805, or 806, and clarifying pixels that are not greater than or equal to each second median value as the background.

The partition binarization unit 240 generates the second binarized image by combining the binarized images for each partition 801, 802, 803, 804, 805, or 806 binarized using the respective median values at the corresponding locations.

Figure 9:
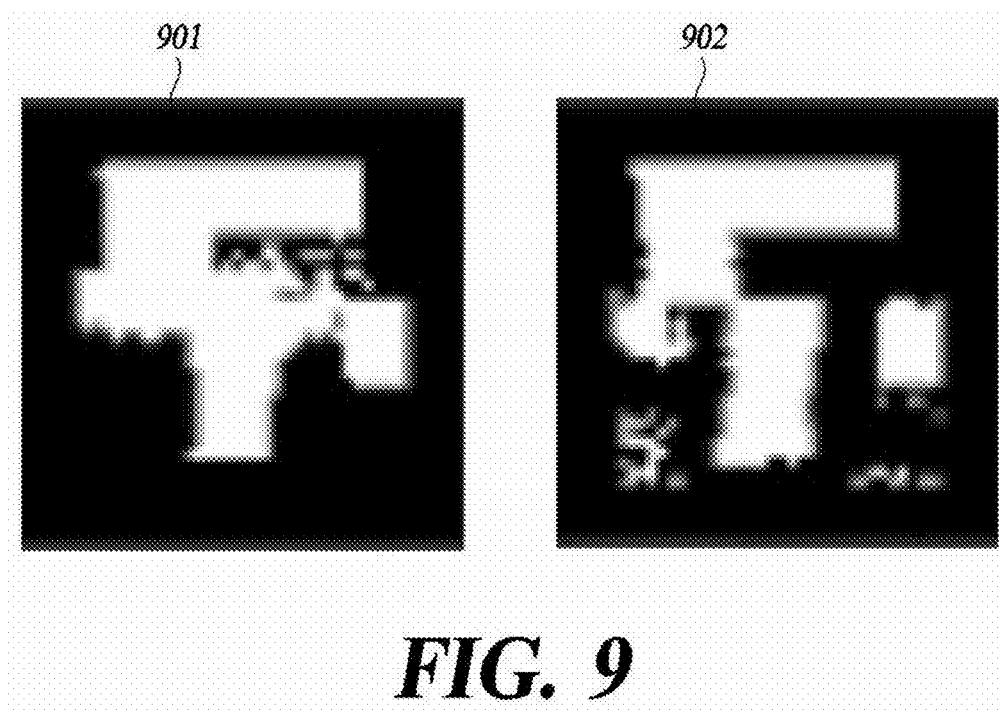
FIG. 9 is a diagram illustrating examples of a first binarized image and a second binarized image, respectively.

FIG. 9 is a diagram illustrating examples of a first binarized image and a second binarized image, respectively.

As illustrated in FIG. 9, a first binarized image 901 and a second binarized image 902 may be generated to have forms that are not the same as each other.

The coded marker detection unit 250 generates an integrated binarized image according to a result of comparing the pixel value of the first binarized image 901 and the pixel value of the second binarized image 902 and acquires AVPS marker data from the integrated binarized image.

The coded marker detection unit 250 generates the integrated binarized image according to a result of comparing pixel values at the same location in the first binarized image 901 and the second binarized image 902.

The coded marker detection unit 250 decides at least one first pixel, which is the foreground in the first binarized image 901 and the foreground in the second binarized image 902, as the foreground of the integrated binarized image. In addition, the coded marker detection unit 250 decides at least one second pixel, which is the background in the first binarized image 901 and the background in the second binarized image 902, as the background of the integrated binarized image.

The coded marker detection unit 250 performs the binarization using the at least one first pixel and the at least one second pixel for at least one third pixel at a location that is neither the first pixel nor the second pixel in the first binarized image 901 and the second binarized image 902.

The coded marker detection unit 250 calculates a first average value, which is an average value of pixels of the normalized image corresponding to a location of the at least one first pixel, and calculates a second average value, which is an average value of pixels of the normalized image corresponding to a location of the at least one second pixel. The coded marker detection unit 250 performs the binarization on the at least one third pixel using the first average value and the second average value to acquire an integrated binarized image.

The coded marker detection unit 250 calculates a third median value, which is an median value between the first average value and the second average value, as a reference value, and performs the binarization on the at least one third pixel based on the third median value to acquire the integrated binarized image. In other words, the coded marker detection unit 250 performs the binarization to classify as the foreground those that are greater than or equal to the third median value among the at least one third pixel value, and classifies as the background those that are not greater than or equal to the third median among the at least one third pixel value.

The coded marker detection unit 250 sets the at least one first pixel as the foreground, sets the at least one second pixel as the background, and combines pixels classified as the foreground and background for the at least one third pixel into one to acquire an integrated binarized image.

Figure 10:
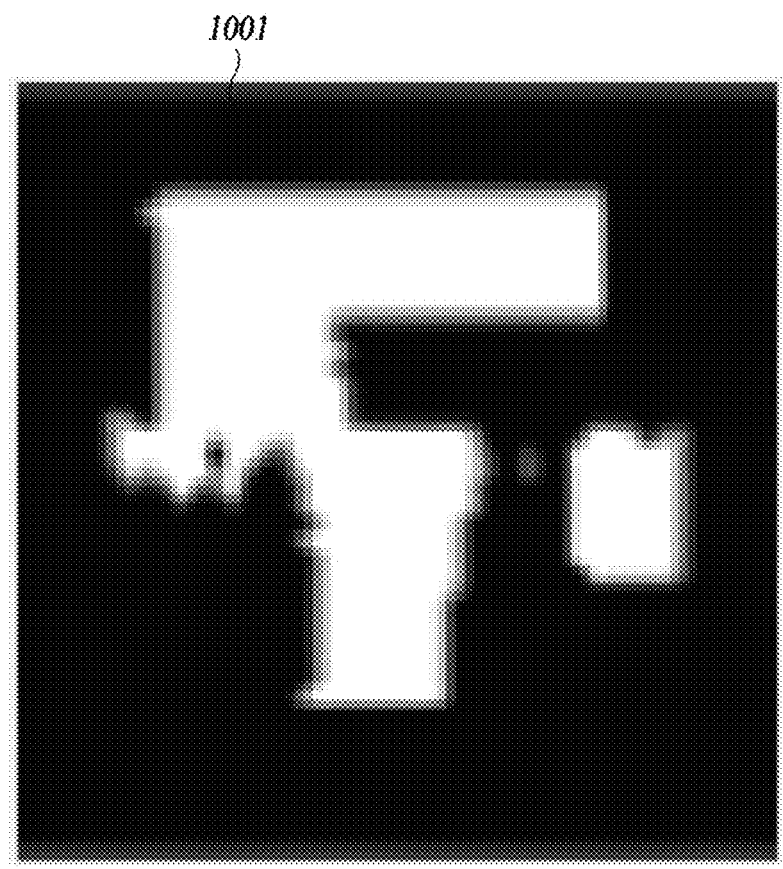
FIG. 10 is a diagram illustrating an integrated binarized image generated from the first binarized image and the second binarized image.

FIG. 10 is a diagram illustrating an integrated binarized image 1001 generated from the first binarized image 901 and the second binarized image 902.

As illustrated in FIG. 10, the integrated binarized image 1001 has reduced noise compared to the first binarized image 901 and the second binarized image 902, and thus is a more reliable binarized image.

Figure 11:
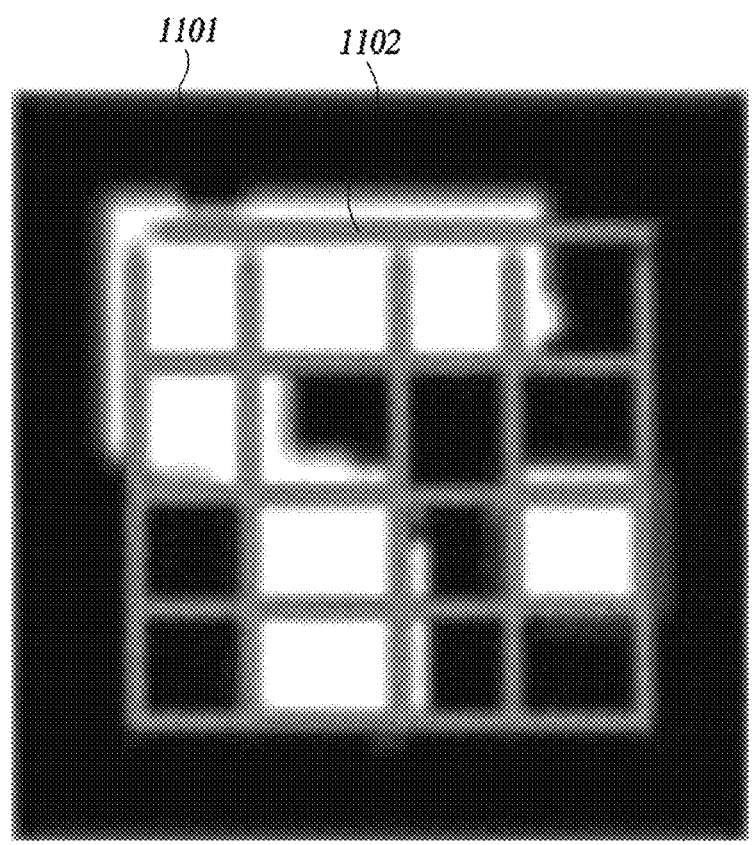
FIG. 11 is an example diagram for explaining an AVPS coded marker ID decoding method.

FIG. 11 is an example diagram for explaining an AVPS coded marker ID decoding method.

As illustrated in FIG. 11, the coded marker detection unit 250 divides the integrated binarized image 1101 into 6×6 partitions of an equal size, and acquires 1 bit of data for each of 16 regions corresponding to a 4×4 partition 1102, excluding a partition in contact with a border of the integrated binarized image 1101, among the 6×6 divided partitions. Thus, a total of 16 bits of AVPS marker data are acquired.

For example, when the integrated binarized image 1101 is formed with 48×48 pixels, the 4×4 data partition 1102 excluding the partition in contact with the border of the integrated binarized image 1101 is formed with 32×32 pixels, and each partition region is formed of 8×8 pixels.

The coded marker detection unit 250 divides each of 16 data partitions into four equal parts in a 2×2 form to generate four sub-partitions. When all sub-partitions among the four sub-partitions are white, the data in the corresponding data partition is discriminated as 1. When any of the four sub-partitions is black, the data in the corresponding data partition is discriminated as 0. Regarding the discrimination of whether the sub-partition is white or black, when the pixels greater than or equal to a preset number are white, the sub-partition may be discriminated to be white, and when the pixels less than or equal to a preset number are white, the sub-partition may be discriminated to be black. For example, when the integrated binarized image 1101 is formed of 48×48 pixels, each sub-partition has 4×4 pixels.

Figure 12:
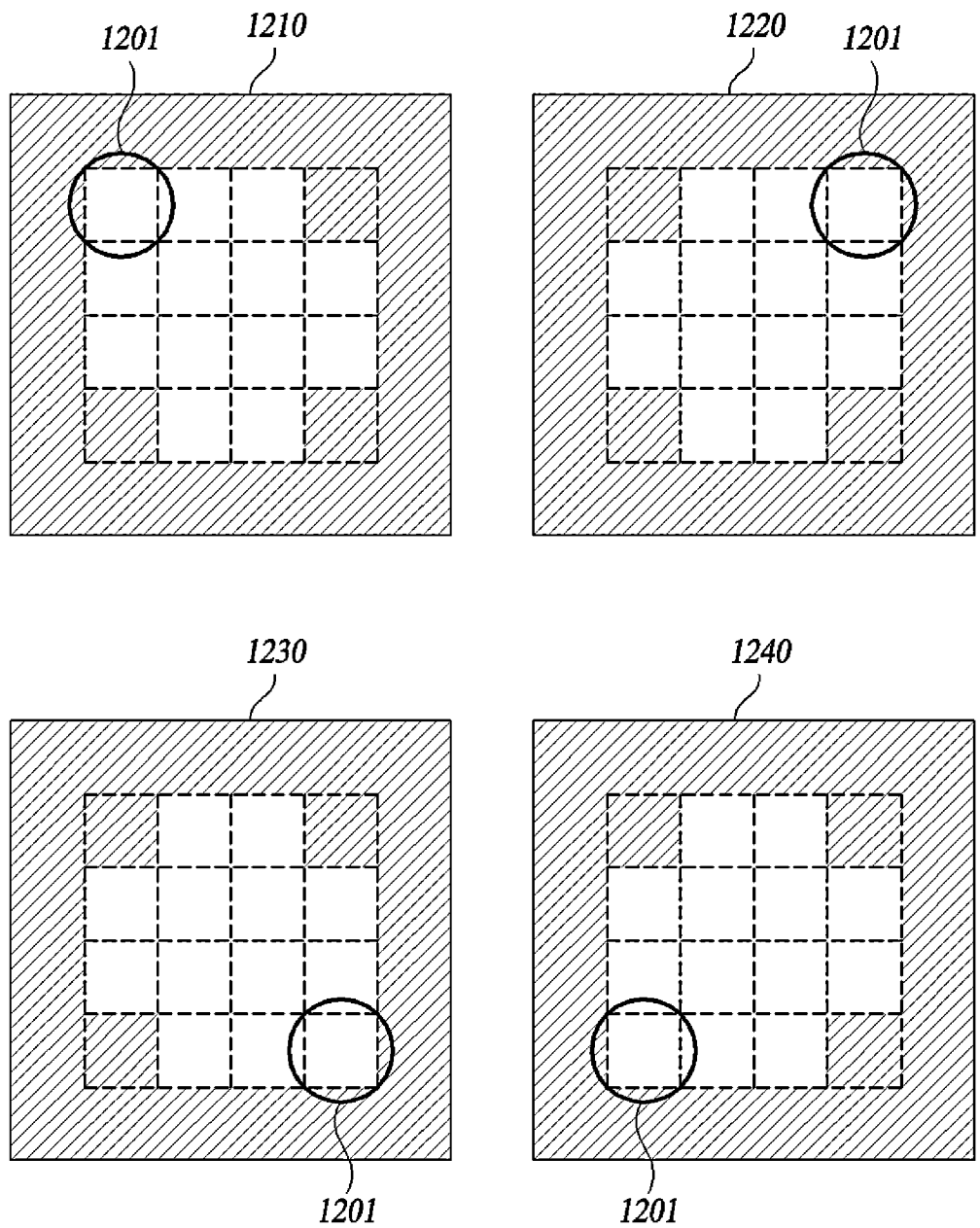
FIG. 12 is a diagram illustrating an integrated binarized image in which AVPS marker data related to a 4×4 data partition is acquired in various forms.

FIG. 12 is a diagram illustrating an integrated binarized image in which AVPS marker data related to a 4×4 data partition is acquired in various forms.

When orientation information is acquired from the AVPS marker data, the coded marker detection unit 250 checks the direction of the AVPS marker data from the orientation information. In other words, four orientation bits function as the orientation information indicating the direction of the integrated binarized image 1101.

Among the AVPS marker data, data located at four edges correspond to orientation bits. When the coded marker detection unit 250 determines that three of the four orientation bits are black and one is white, it interprets the orientation bit as normal. When the coded marker detection unit 250 determines that there are 2 or more or 0 white edges among the four edges, it is interpreted that the orientation bit is not normal, and the acquired AVPS marker data is determined to have no valid direction.

As illustrated in FIG. 12, the AVPS coded marker may be detected while being located in various directions.

Among the AVPS coded markers in the normalized image shown at 1210, 1220, 1230, and 1240 in FIG. 12, when a white orientation bit 1201 is located in a left and top edge, the AVPS marker was detected in a normal direction 1210.

Accordingly, when the AVPS coded marker is not detected in a normal direction 1220, 1230, or 1240, the coded marker detection unit 250 rotates the AVPS coded marker so that a white orientation bit 901 is located in the left and top edge and interprets the AVPS marker data after converting the same into an AVPS marker corresponding to the normal direction 1210.

Figures 13, 14:
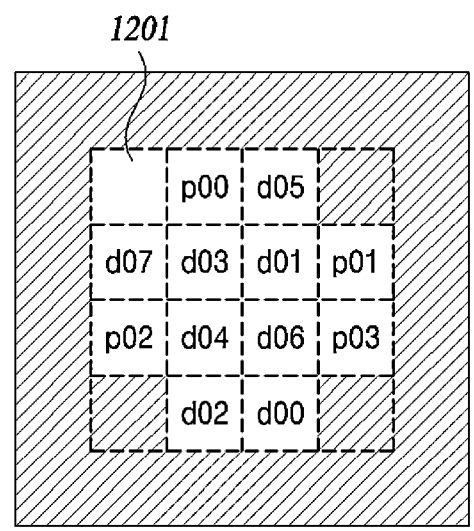
FIG. 13 is a diagram illustrating the form of detected AVPS marker data.
FIG. 14 is a diagram illustrating the decoding algorithm of an AVPS coded marker ID.

FIG. 13 is a diagram illustrating the form of detected AVPS marker data.

The coded marker detection unit 250 interprets a bit value of a region as 0 when the color of each region in the 4×4 partition of FIG. 13 is black, and interprets the bit value of the region as 1 when the color of each region is white.

In the case of FIG. 13, the orientation bit 1201 in the left and top edge is 1 and the orientation bits corresponding to the remaining edges are all 0, so it may be interpreted as the AVPS marker data with a valid orientation.

When the detected AVPS marker data is determined to have a valid orientation, the coded marker detection unit 250 performs a parity check using parity bits.

In FIG. 13, p00, p01, p02, and p03 correspond to parity bits. In addition, d00, d01, d02, d03, d04, d05, d06, and d07 correspond to data bits.

The coded marker detection unit 250 performs a first parity check to determine whether the last bit value of a result value of binary operation of d00+d01+d03+d04+d06 is equal to p00, performs a second parity check to determine whether the last bit value of a result value of binary operation of d00+d02+d03+d05+d06 is equal to p01, performs a third parity check to determine whether the last bit value of a result value of binary operation of d01+d02+d03+d07 is equal to p02, and performs a fourth parity check to determine whether the last bit value of a result value of binary operation of d04+d05+d06+d07 is equal to p03.

When there is no abnormality as a result of performing the first to fourth parity checks, the coded marker detection unit 250 determines that the detected AVPS marker data is valid data.

When it is determined that valid AVPS marker data has been acquired, the coded marker detection unit 250 decodes the AVPS coded marker ID using data bits.

FIG. 14 is a diagram illustrating the decoding algorithm of an AVPS coded marker ID.

As illustrated in the algorithm of FIG. 14, the AVPS coded marker ID is decided depending on whether the values of d00 to d07 are 11 or 0, respectively.

In FIG. 14, the finally calculated m_candidate.ID means the AVPS coded marker ID, m_bitCode.m_bBits[d] means the bit values of d00 to d07, and d means an index value of 0 to 7 corresponding to d00 to d07, respectively.

Figure 15:
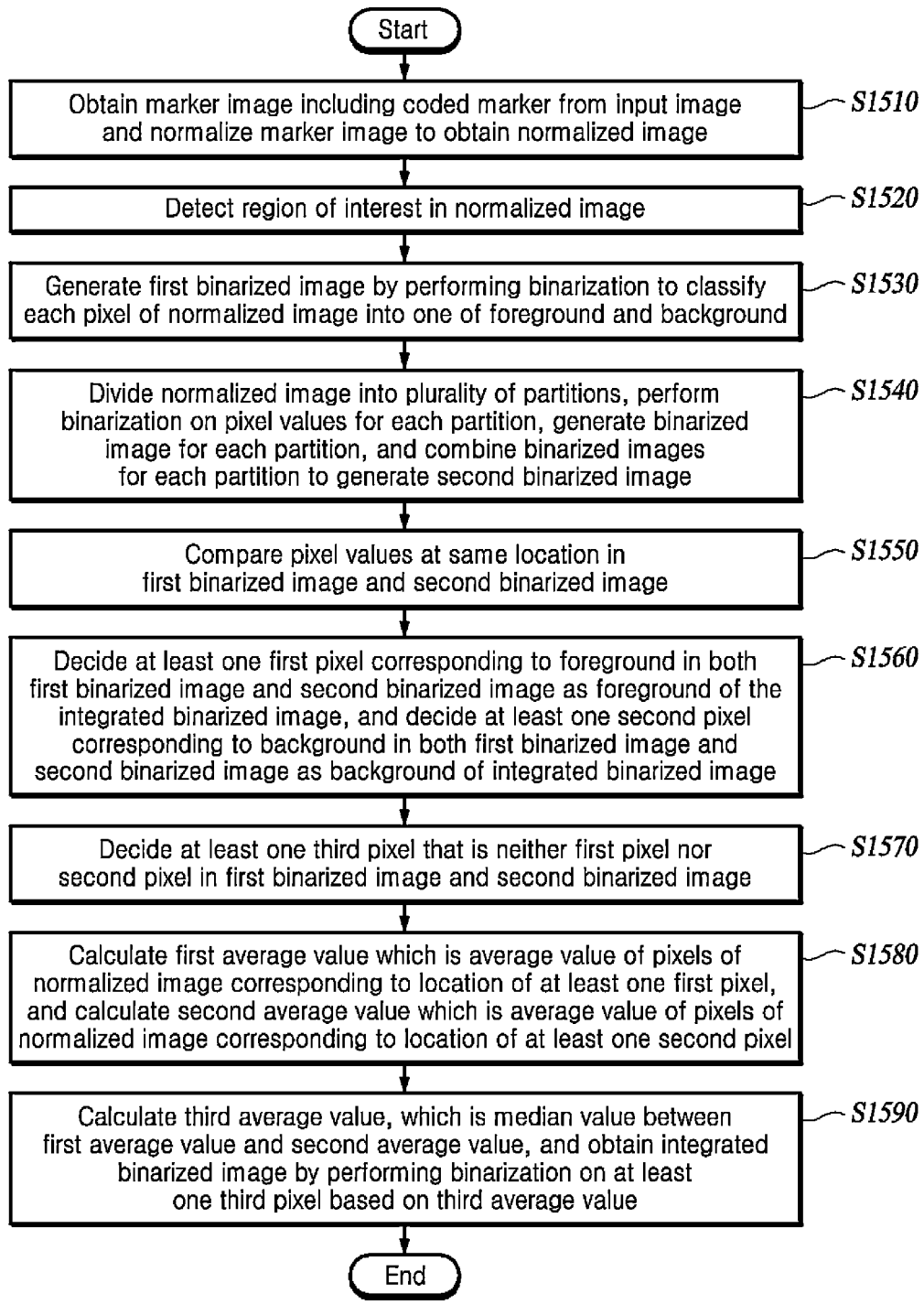
FIG. 15 is a flowchart illustrating a coded marker recognition method according to an embodiment of the present disclosure.

FIG. 15 is a flowchart illustrating a coded marker recognition method according to an embodiment of the present disclosure.

The coded marker recognition method according to an embodiment of the present disclosure is performed by a coded marker recognition apparatus 100.

The marker image acquisition unit 210 performs a marker image acquisition process to acquire a marker image including a coded marker from an input image and normalize the marker image to acquire a normalized image (S1510).

The ROI detection unit 220 performs an ROI detection process to detect an ROI of the normalized image (S1520).

The image binarization unit 230 performs an image binarization process to generate a first binarization image by performing binarization to classify each pixel of the normalized image into one of a foreground and a background (S1530).

The partition binarization unit 240 performs a partition binarization process to divide the normalized image into a plurality of partitions, perform the binarization on pixel values for each partition, generate a binarized image for the each partition, and combine the binarized images for each partition to generate a second binarized image (S1540).

The coded marker detection unit 250 compares pixel values at the same location in the first binarized image and the second binarized image (S1550).

The coded marker detection unit 250 decides at least one first pixel corresponding to the foreground in both the first binarized image and the second binarized image as the foreground of the integrated binarized image, and decides at least one second pixel corresponding to the background in both the first binarized image and the second binarized image as the background of the integrated binarized image (S1560).

The coded marker detection unit 250 decides at least one third pixel in a location that is neither the first pixel nor the second pixel in the first binarized image and the second binarized image (S1570).

The coded marker detection unit 250 calculates, for the at least one third pixel, a first average value, which is the average value of pixels of the normalized image corresponding to the location of the at least one first pixel, and calculates a second average value, which is the average value of pixels of the normalized image corresponding to the location of the at least one second pixel (S1580).

The coded marker detection unit 250 calculates a third median value, which is an median value between the first average value and the second average value, as a reference value, and performs binarization on the at least one third pixel based on the third median value to acquire the integrated binarized image (S1590).

At least some of the components described in the exemplary embodiments of the present disclosure may be implemented as hardware elements including at least one or a combination of a digital signal processor (DSP), a processor, a controller, an application-specific IC (ASIC), a programmable logic device (FPGA, etc.), and other electronic devices. In addition, at least some of the functions or processes described in the exemplary embodiments may be implemented as software, and the software may be stored in a recording medium. At least some of the components, functions, and processes described in the exemplary embodiments of the present disclosure may be implemented through a combination of hardware and software.

The methods according to the exemplary embodiments of the present disclosure may be written as a program that can be executed on a computer, and may also be implemented in various recording mediums such as a magnetic storage medium, an optical read medium, and a digital storage medium.

Implementations of the various techniques described herein may be realized by digital electronic circuitry, or by computer hardware, firmware, software, or combinations thereof. Implementations may be made as a computer program tangibly embodied in a computer program product, i.e., an information carrier, e.g., machine-readable storage device (computer-readable medium) or a radio signal, for processing by, or controlling the operation of a data processing device, e.g., a programmable processor, a computer, or multiple computers. Computer programs, such as the computer program(s) described above, may be written in any form of programming language, including compiled or interpreted languages, and may be deployed in any form as a stand-alone program or as a module, component, subroutine, or other units suitable for use in a computing environment. The computer program may be processed on one computer or multiple computers at one site or distributed across multiple sites and developed to be interconnected through a communications network.

Processors suitable for processing computer programs include, by way of example, both general-purpose and special-purpose microprocessors, and any one or more processors of any type of digital computer. Typically, a processor will receive instructions and data from read-only memory or random access memory, or both. Elements of the computer may include at least one processor that executes instructions and one or more memory devices that store instructions and data. In general, the computer may include one or more mass storage devices that store data, such as magnetic disks, magneto-optical disks, or optical disks, or may be coupled to the mass storage devices to receive data therefrom and/or transmit data thereto. Information carriers suitable for embodying computer program instructions and data include, for example, semiconductor memory devices, magnetic mediums such as hard disks, floppy disks, and magnetic tapes, optical mediums such as CD-ROM (Compact Disk Read Only Memory), DVD (Digital Video Disk), magneto-optical mediums such as floptical disk, ROM (Read Only Memory), RAM (Random Access Memory), flash memory, EPROM (Erasable Programmable ROM), and EEPROM (Electrically Erasable Programmable ROM). The processor and memory may be supplemented by or included in special purpose logic circuitry.

The processor may execute an operating system and software applications executed on the operating system. In addition, the processor device may access, store, manipulate, process, and generate data in response to the execution of software. For ease of understanding, the processor device may be described as being used as a single processor device, but those skilled in the art will understand that the processor device may include a plurality of processing elements and/or a plurality of types of processing elements. For example, a processor device may include a plurality of processors or one processor, and one controller. Further, other processing configurations, such as parallel processors, are also possible.

In addition, a non-transitory computer-readable medium may be any available medium that can be accessed by a computer and may include both a computer storage medium and a transmission medium.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, one of ordinary skill would understand that the scope of the claimed invention is not to be limited by the above explicitly described embodiments but by the claims and equivalents thereof.

What is claimed is:

1. An apparatus comprising:
   at least one processor; and
   a memory operably connected to the at least one processor, wherein the memory stores instructions for causing the at least one processor to perform operations in response to execution of the instructions by the at least one processor, the operations comprising:
      obtaining a marker image including a coded marker from an input image and normalizing the marker image to obtain a normalized image;
      detecting a region of interest in the normalized image;
      generating a first binarized image by performing binarization to classify each pixel of the normalized image into one of a foreground and a background;
      generating a second binarized image by dividing the normalized image into a plurality of partitions, performing binarization for pixel values for each partition to generate a binarized image for the each partition, and combining the binarized images for the each partition;
      generating an integrated binarized image according to a result of comparing pixel values at a same location in the first binarized image and the second binarized image; and
      obtaining identification data of the coded marker from the integrated binarized image.

2. The apparatus of claim 1, wherein the detecting of the region of interest includes performing a harr-like feature search on a left ⅓ region, a top ⅓ region, a right ⅓ region, and a bottom ⅓ region of the normalized image, respectively.

3. The apparatus of claim 1, wherein the generating of the first binarized image includes:
   determining a first median value which is a median value of pixels of the region of interest in the normalized image; and
   performing binarization on each pixel value of the normalized image based on the first median value.

4. The apparatus of claim 1, wherein the generating of the second binarized image includes:
   determining, for the each partition, a second median value which is a median value of border pixels of the each partition; and
   generating the binarized image for the each partition by binarizing pixel values for the each partition based on the second median value.

5. The apparatus of claim 1, wherein the generating of the integrated binarized image includes:
   deciding that at least one first pixel corresponding to a foreground in both the first binarized image and the second binarized image is a foreground of the integrated binarized image; and
   deciding that at least one second pixel corresponding to a background in both the first binarized image and the second binarized image is a background of the integrated binarized image.

6. The apparatus of claim 5, wherein the generating of the integrated binarized image includes performing the binarization for at least one third pixel that is neither the first pixel nor the second pixel in the first binarized image and the second binarized image using the at least one first pixel and the at least one second pixel.

7. The apparatus of claim 6, wherein the generating of the integrated binarized image includes:
   determining a first average value which is an average value of pixels in the normalized image corresponding to a location of the at least one first pixel;
   determining a second average value which is an average value of pixels in the normalized image corresponding to a location of the at least one second pixel; and
   performing binarization on the at least one third pixel using the first average value and the second average value.

8. The apparatus of claim 7, wherein the generating of the integrated binarized image includes:
   determining a third median value, which is an median value between the first average value and the second average value; and
   performing binarization on the at least one third pixel based on the third median value.

9. The apparatus of claim 1, wherein the obtaining of the identification data of the coded marker includes:
   dividing the integrated binarized image into 6×6 partitions of an equal size; and
   decoding each of 4×4 partitions not on a border of the integrated binarized image among the 6×6 partitions.

10. The apparatus of claim 1, wherein the operations further includes:
    obtaining a current location of a vehicle within a parking facility based on the identification data of the coded marker and automated valet parking system (AVPS) parking facility marker information by matching the identification data of the coded marker with marker ID in the AVPS parking facility marker information.

11. A computer-implemented method for recognizing a coded marker, the method comprising:
    obtaining, by at least one processor, a marker image including a coded marker from an input image and normalizing the marker image to obtain a normalized image;
    detecting, by the at least one processor, a region of interest in the normalized image;
    generating, by the at least one processor, a first binarized image by performing binarization to classify each pixel of the normalized image into one of a foreground and a background;
    generating, by the at least one processor, a second binarized image by dividing the normalized image into a plurality of partitions, performing binarization for pixel values for each partition to generate a binarized image for the each partition, and combining the binarized images for the each partition;
    generating, by the at least one processor, an integrated binarized image according to a result of comparing pixel values at a same location in the first binarized image and the second binarized image; and
    obtaining, by the at least one processor, identification data of the coded marker from the integrated binarized image.

12. The method of claim 11, wherein the detecting of the region of interest includes performing a harr-like feature search on a left ⅓ region, a top ⅓ region, a right ⅓ region, and a bottom ⅓ region of the normalized image, respectively.

13. The method of claim 11, wherein the generating of the first binarized image includes:
    determining a first median value which is a median value of pixels of the region of interest in the normalized image; and performing binarization on each pixel value of the normalized image based on the first median value.

14. The method of claim 11, wherein the generating of the second binarized image includes:
   determining, for the each partition, a second median value which is a median value of border pixels of the each partition; and
   generating the binarized image for the each partition by binarizing pixel values for the each partition based on the second median value.

15. The method of claim 11, wherein the generating of the integrated binarized image includes:
   deciding that at least one first pixel corresponding to a foreground in both the first binarized image and the second binarized image is a foreground of the integrated binarized image; and
   deciding that at least one second pixel corresponding to a background in both the first binarized image and the second binarized image is a background of the integrated binarized image.

16. The method of claim 15, wherein the generating of the integrated binarized image includes performing the binarization for at least one third pixel that is neither the first pixel nor the second pixel in the first binarized image and the second binarized image using the at least one first pixel and the at least one second pixel.

17. The method of claim 16, wherein the generating of the integrated binarized image includes:
   determining a first average value which is an average value of pixels in the normalized image corresponding to a location of the at least one first pixel;
   determining a second average value which is an average value of pixels in the normalized image corresponding to a location of the at least one second pixel; and
   performing binarization on the at least one third pixel using the first average value and the second average value.

18. The method of claim 17, wherein the generating of the integrated binarized image includes:
   determining a third median value, which is an median value between the first average value and the second average value; and
   performing binarization on the at least one third pixel based on the third median value.

19. The method of claim 11, wherein the obtaining of the identification data of the coded marker includes:
   dividing the integrated binarized image into 6×6 partitions of an equal size; and
   decoding each of 4×4 partitions not on a border of the integrated binarized image among the 6×6 partitions.

20. The method of claim 11, further including:
   obtaining a current location of a vehicle within a parking facility based on the identification data of the coded marker and automated valet parking system (AVPS) parking facility marker information by matching the identification data of the coded marker with marker ID in the AVPS parking facility marker information.

* * * * *